United States Patent [19]

Donaldson

[11] 4,121,061
[45] Oct. 17, 1978

[54] TELEPHONE HOLDER

[75] Inventor: Robert G. Donaldson, Chicago, Ill.

[73] Assignee: The Raymond Lee Organization, Inc., New York, N.Y.

[21] Appl. No.: 823,517

[22] Filed: Aug. 10, 1977

[51] Int. Cl.² ............................................. H04M 1/05
[52] U.S. Cl. .................................. 179/156 R; 179/179
[58] Field of Search ................... 179/156 R, 179, 147, 179/148 R, 149

[56] References Cited

U.S. PATENT DOCUMENTS

| 2,020,084 | 11/1955 | Sidders | 179/156 R |
| 2,475,303 | 7/1949 | Allen et al. | 179/179 |
| 2,854,523 | 9/1958 | Lewis | 179/156 R |

Primary Examiner—William C. Cooper
Attorney, Agent, or Firm—Howard I. Podell

[57] ABSTRACT

A telephone holder which comprises a cradle enclosing a telephone hand set and an arcuate, head-engaging plastic or metal band connected to the cradle by a universal joint.

2 Claims, 4 Drawing Figures

TELEPHONE HOLDER

FIELD OF THE INVENTION

This invention relates generally to holder attachments for telephone hand sets. More particularly, the invention relates to a device which facilitates use of a telephone by persons having only one hand or with prosthetic hands. Advantageously, this device completely frees both hands of the user for other movements and does not interfere with head movements.

THE PRIOR ART

The prior art, as exemplified by U.S. Pat. Nos. 2,481,387; 2,538,458; 2,486,438 and 2,408,720 is generally illustrative of various devices of this type. While such devices are generally acceptable for their intended purpose, they have not proven to be entirely satisfactory in that they are either complex and expensive to manufacture, or bulky and inconvenient to use, or require unusual skill and/or dexterity to operate. As a result of the shortcomings of the prior art, typified by the above, there has developed and continues to exist a substantial need for devices of the character described. Despite this need, and the efforts of many individuals and companies to develop such devices, a satisfactory device meeting this need has heretofore been unavailable.

The principal object of this invention is to provide a device or article of this character which combines simplicity, strength and durability in a high degree, together with inexpensiveness of construction.

Other objects of this invention will in part be obvious and in part hereinafter pointed out.

SUMMARY OF THE INVENTION

This invention resides in a telephone holder which comprises a cradle enclosing a telephone hand set and an accurate, headengaging plastic or metal band connected to the cradle by a universal joint.

BRIEF DESCRIPTION OF THE DRAWINGS

In the accompanying drawing, in which is shown one of the various possible illustrative embodiments of this invention, wherein like reference character identify the same or like parts.

ABSTRACT OF THE PREFERRED EMBODIMENT

Figure 1:
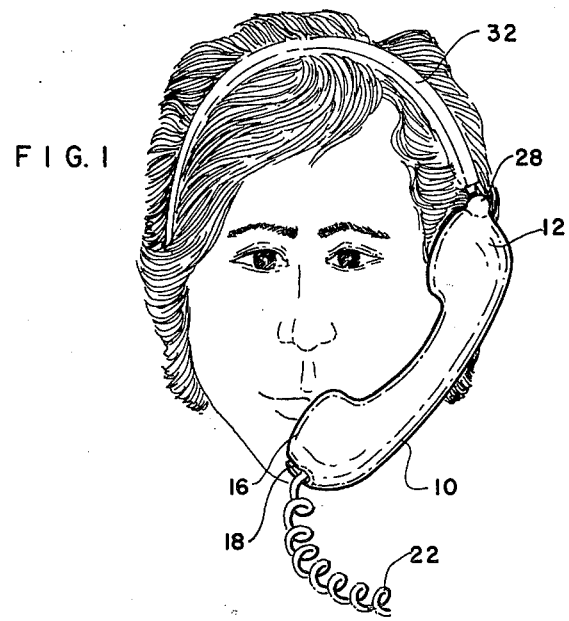
FIG. 1 is a front elevational view showing the invention in use.

Referring now in somewhat greater detail to FIG. 1, the holder of the invention comprises a cradle 10 molded from suitable molding material such as polyethylene or polypropylene or other plastic which will form a partially resilient finished article so as to snap fit therein regular and "trimline" instruments.

Cradle 10 is hollow and shaped in the form of a hand set.

Figure 2:
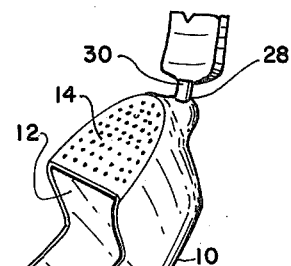
FIG. 2 is a view in perspective of the holder.
Figure 4:
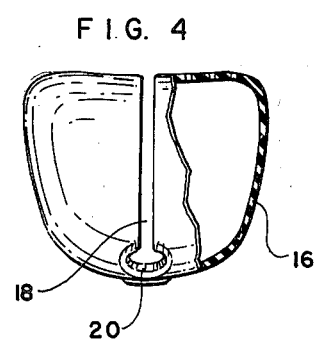
FIG. 4 is an end view partly in section of the mouthpiece-receiving cup forming part of the holder.
Figure 3:
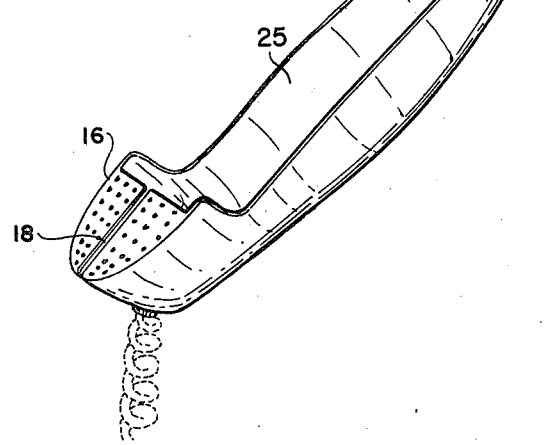
FIG. 3 is a section through the holder.
Figure 3:
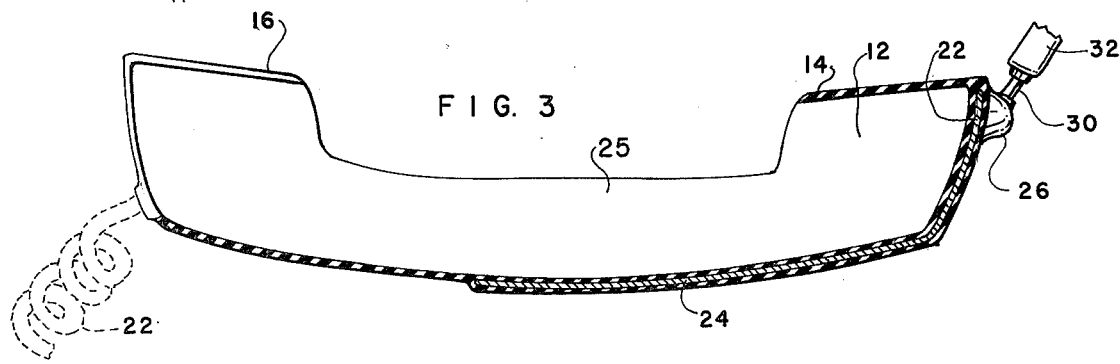

As shown in FIG. 2, cradle 10 includes an upper, ear-piece receiving cup 12 formed with a perforated top 14 in communication with similar perforations on the ear piece. A hollow body section 25 connects upper cup 12 to mouthpiece-receiving lower cup 16 which has a perforated top split by a central slot 18 terminating in a rounded end 20 for passing therethrough and holding phone cord 22. Upper cup 12 is larger than lower cup 16 so that when the phone handset is inserted or removed, it will have room to clear the lower cup 16.

To stiffen cradle 10 and upper cup 12 a slot 22 is formed therein in the back thereof in which is placed a steel band 24 which conforms in shape therewith.

Steel band 24 also serves to fasten in any suitable way, such as by rivets, to the end of cup 12 the socket 26 of universal joint 28 similarly made of metal.

A lever 30 forming part of joint 28 has its outer end rigidly secured to a head engaging member 32. This member comprises a flat elongated band curved to fit over and overlap the user's head substantially from ear to ear as shown in FIG. 1. The head engaging member is formed preferably from a resilient material such as a plastic material so that is may snugly grip the user's head. It may also be made of thin metal.

If desired, a counter-weight may be secured to the free end of band 32.

The present device advantageously can be used for long periods of time without tiring restrictive head movements. Moreover, this device can remain on the head even when the phone is not in use. It can be used by a person who has no hands after the phone has been inserted therein having an open top the holder does not interfere with the operation of the phone. The phone also can be inserted in the holder with one hand.

The device of the invention has been thoroughly tested under actual use conditions and has been found to be completely successful for the accomplishement of the above stated objects of the invention.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use.

It is thought that persons skilled in the art to which this invention relates will be able to obtain a clear understanding of the invention after considering the foregoing description in connection with the accompanying drawing. Therefor, a more lengthy description is deemed unnecessary.

It is to be understood that various changes in shape, size, and arrangement of the elements of this invention as claimed may be resorted to in actual practice, if desired.

Having thus described the invention, what is claimed as new and to be secured by Letters Patent is:

1. A holder for removably fitting about and holding a telephone hand set therein comprising a one-piece cradle for said hand set; said cradle having a hollow ear piece-receiving first cup, a smaller, hollow mouthpiece-receiving second cup connected to said first cup by a hollow, open body portion; and an arcuate, head-engaging member adapted to fit over and embrace the head of the wearer, which head-engaging member is attached to an end wall of the said first cup, wherein said cradle is formed of a resilient material, with the first and second said cups formed with a perforated cover section, in which a through slot is formed in the cover section of the mouthpiece-receiving second cup to divide the said cover section, with said slot continuing along an end wall of the said second cup and terminating at a rounded rim end which bounds an opening of a size to provide a passaage for a telephone cord extending from the mouthpiece end of the telephone hand set fitted in said holder.

2. The invention defined in claim 1 in which a metal reinforcement member is embedded in a wall of the open body portion, with said metal member extending in the end wall of the first cup to with the head-engaging member is attached.

* * * * *